United States Patent [19]

Smith

[11] Patent Number: 4,943,261
[45] Date of Patent: Jul. 24, 1990

[54] FLEXIBLE SHAFT COUPLING HAVING FLEXIBLE ELEMENTS INTERSPERSED BETWEEN ALTERNATING ATTACHMENT WEDGES

[75] Inventor: Roy E. Smith, Kingston, Canada

[73] Assignee: UTDC Inc., Kingston, Canada

[21] Appl. No.: 350,805

[22] Filed: May 12, 1989

[51] Int. Cl.$^5$ .................................................. F16D 3/78
[52] U.S. Cl. ........................................ 464/76; 464/81; 464/147
[58] Field of Search ................. 464/69, 73, 76, 81, 464/85, 92, 93, 147

[56] References Cited

U.S. PATENT DOCUMENTS

| | | | |
|---|---|---|---|
| 1,483,561 | 12/1919 | Ungar | 464/69 |
| 2,122,838 | 7/1938 | Guy | 464/76 |
| 2,213,277 | 9/1940 | Guy | 464/73 |
| 2,301,659 | 11/1942 | Ricefield | 464/73 |
| 2,876,635 | 3/1959 | Saurer | 464/73 |
| 2,884,772 | 5/1959 | Amberg | 464/81 |
| 3,238,742 | 3/1966 | Martorana | 464/93 |
| 3,396,555 | 8/1968 | Boschi et al. | 464/85 |
| 3,504,509 | 4/1970 | Paulsen | 464/85 |
| 3,505,832 | 4/1970 | Braithwaite | 464/76 |
| 3,540,233 | 11/1988 | Pearson | 464/74 |
| 4,743,218 | 5/1988 | Aubrey et al. | 464/85 X |

FOREIGN PATENT DOCUMENTS 195300 3/1923 United Kingdom .................. 464/85

Primary Examiner—Daniel P. Stodola
Attorney, Agent, or Firm—Rogers, Bereskin & Parr

[57] ABSTRACT

A flexible drive coupling for transmitting rotational forces between respective flanges of a driving shaft and a driven shaft. The flexible drive coupling has, in a substantially planar circular configuration, a number of wedges. The wedges have respective end faces facing the adjacent wedges and connected thereto by flexible elements. Alternate wedges attach respectively to the flanges of the driving and driven shafts. The flexible elements consist of a link between two end plates. The mating faces of the link and the end plates are curved so that they co-operate one with the other. An elastomeric filler occupies the space between the curved surfaces of the end plates and the links permitting each end plate to pivot with respect to the link by deforming the elastomeric filler. The end faces of the wedges and, the corresponding faces of the end plates of the flexible elements which face them, have co-operating tabs and recesses to prevent relative radial and axial movement. On attaching the flexible drive coupling to the driving and driven shafts, the wedges can be forced radially inward and so secured that the flexible elements are pre-loaded in radial compression.

10 Claims, 3 Drawing Sheets

FLEXIBLE SHAFT COUPLING HAVING FLEXIBLE ELEMENTS INTERSPERSED BETWEEN ALTERNATING ATTACHMENT WEDGES

FIELD OF THE INVENTION

This invention relates to couplings for connecting shafts and more particularly to flexible couplings in which various misalignments of the connected shafts are accommodated by flexion of flexible elements in the coupling.

BACKGROUND OF THE INVENTION

Flexible couplings are used to transmit rotational forces between two non-collinear shafts, the rotational axis of which intersect approximately in the center of the coupling. "Rotational axis" refers to the axis about which the shaft rotates. The non-collinear orientation of the coupled shafts described above is referred to as "angular misalignment".

Typical flexible coupling assemblies embody attachment means for attaching the coupling to the driving and driven shafts respectively. At least one load transmitting element is used to transmit forces between the respective attachment means despite angular misalignment of the two shafts.

Prior flexible couplings have used either rigid or resilient load transmitting elements. Typical rigid load transmitting elements comprise a rod or rocker having bearing surfaces at both ends which permit the element to rock or pivot, relative to the attachment means, in response to angular misalignment of the driving and driven shafts. A disadvantage with this type of load transmitting element is that it will develop free play and, unless the motion along the axis ("axial motion") of the respective attachment means is constrained, torque applied to this type of coupling will cause it to disassemble.

In order to provide a constraint against the tendency to disassemble and development of free play inherent in couplings having rigid load transferring elements, couplings have been developed which utilize a resilient material between conforming surfaces of the attachment means as transmitting elements. A disadvantage with resilient load transmitting elements is that if they are to be large enough to withstand large torque loads, excessive resistance to angular misalignment arises due to the forces required to deform the resilient elements to flex the coupling.

While attempts have been made to reinforce a resilient load transferring element by using two layers of resilient material separated by a rigid material, the decrease in thickness of the resilient portion of such an element greatly reduces the angular misalignment which a coupling embodying such an element can accommodate.

SUMMARY OF THE INVENTION

This invention provides a flexible drive coupling for transmitting rotational forces between respective attachment means of a driving shaft and of a driven shaft. The flexible drive coupling has a plurality of wedges for alternating attachment to the attachment means of the driving and driven shafts. Each of the wedges has end faces. A plurality of flexible elements are interspersed between respective end faces of adjacent wedges. The flexible elements have a link having two curved end surfaces and two end plates. Each end plate has respective inner and outer surfaces. The inner surfaces of each end plate is shaped so as to co-operate with a respective one of the curved end surfaces of the link. The flexible elements further have an elastomeric filler between each of the inner surfaces of the end plates and the curved end surfaces of the link so that each end plate may pivot with respect to the link by deforming the elastomeric filler. Additionally, the outer surfaces of the end plates and the end faces of the wedges have co-operating tabs and recesses to prevent relative radial and axial movement.

BRIEF DESCRIPTION OF THE DRAWINGS

Reference will now be made to the accompanying drawings which illustrate a preferred embodiment of the invention by way of example and in which.

DESCRIPTION OF THE PREFERRED EMBODIMENT

Figure 1:
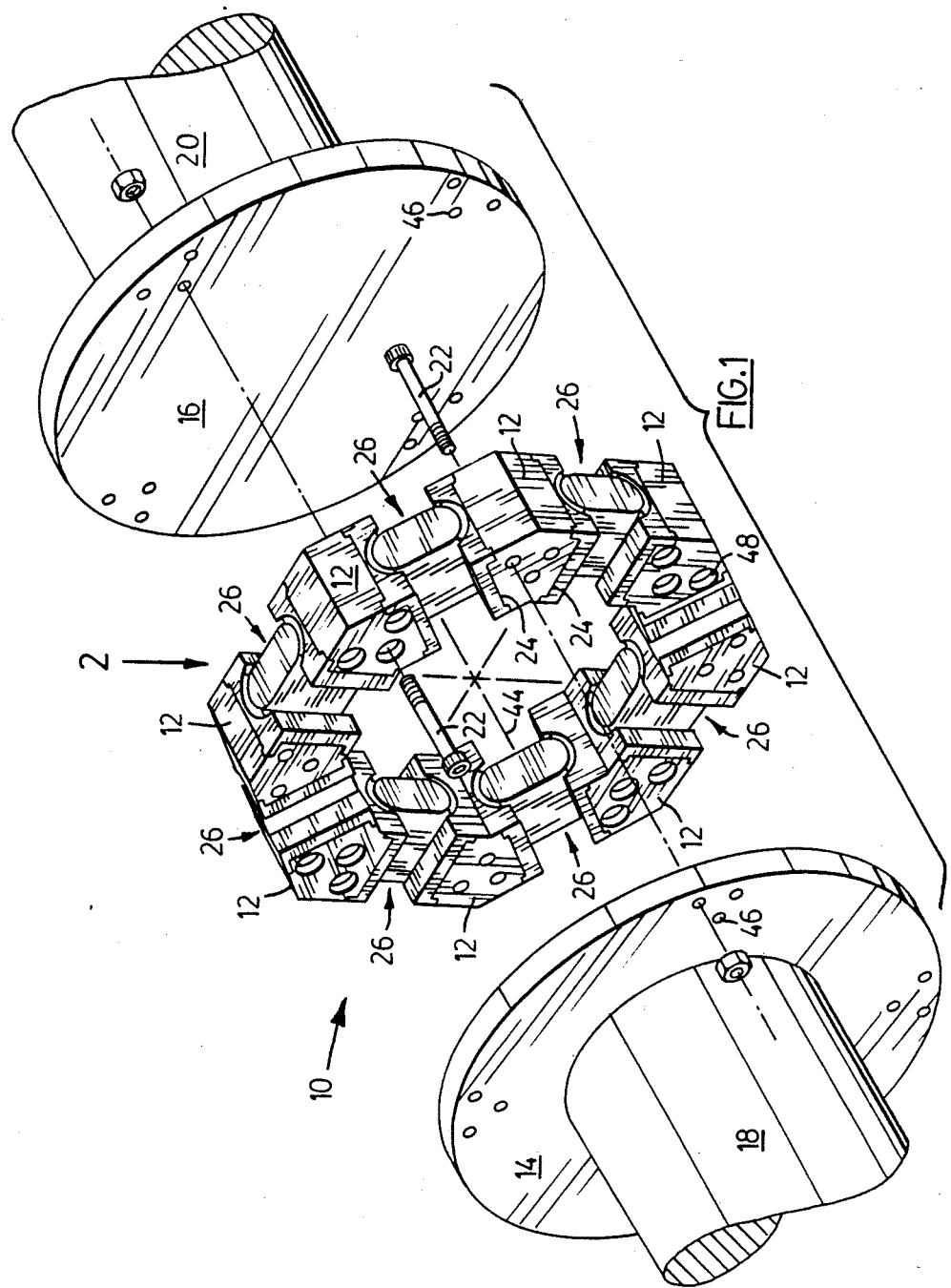
FIG. 1 is a perspective view of the flexible drive coupling of the present invention showing typical driving and driven elements to which it would be attached.

The flexible coupling is identified generally by reference 10 in FIG. 1. The coupling has a number of wedges 12 in a generally circular layout about an axis of symmetry 44. The wedges 12 are alternatingly attached to the flanges 14 and 16 of the driving and driven shafts 18 and 20 respectively. Attachment can be by connectors such as bolts 22 or machine screws. The connectors engage corresponding engagement points or bolt holes 48 and 46 in the wedges 12 and flanges 14 and 18 respectively. It will be appreciated that because of the alternating attachment of the wedges 12 to the flanges 14 and 16, the wedges 12 on either side of any particular wedge will be attached to the opposite flange.

The flanges 14 and 16 act as attachment means for attaching the wedges to the driving and driven shafts 18 and 20 respectively. The labelling of the driving and driven shafts 18 and 20 respectively as such is to assist in the description of the present invention. A driving shaft is one which provides torque input into the coupling and a driven shaft is one which receives torque input from the driving shaft through the coupling. It's possible therefore for the same shaft to act as a driving or a driven shaft at different times depending on whether it is causing the opposite shaft to rotate or vice versa.

Figure 4:
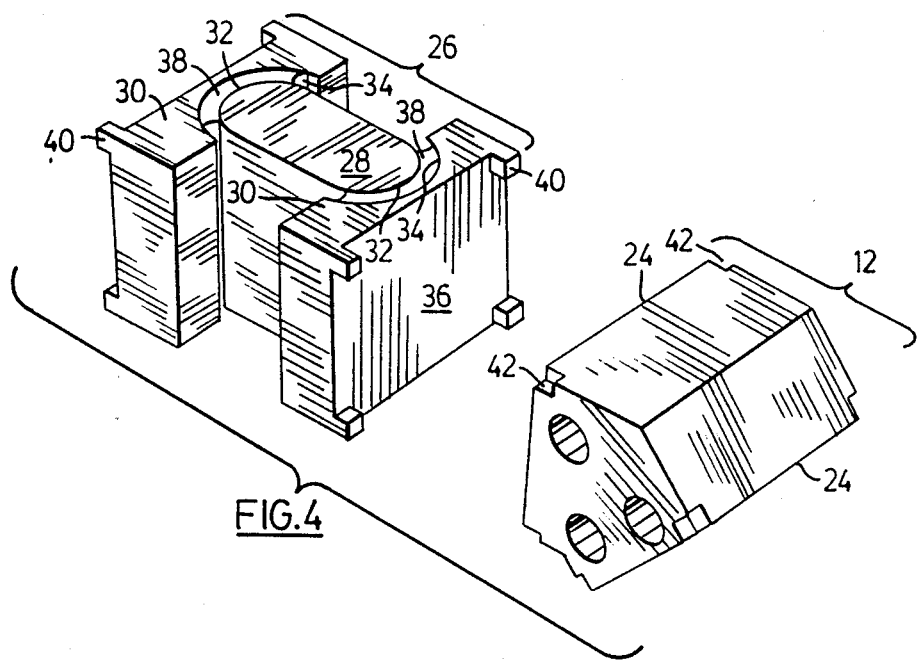
FIG. 4 is a perspective view of a wedge and a flexible element according to the present invention.
Figure 5:
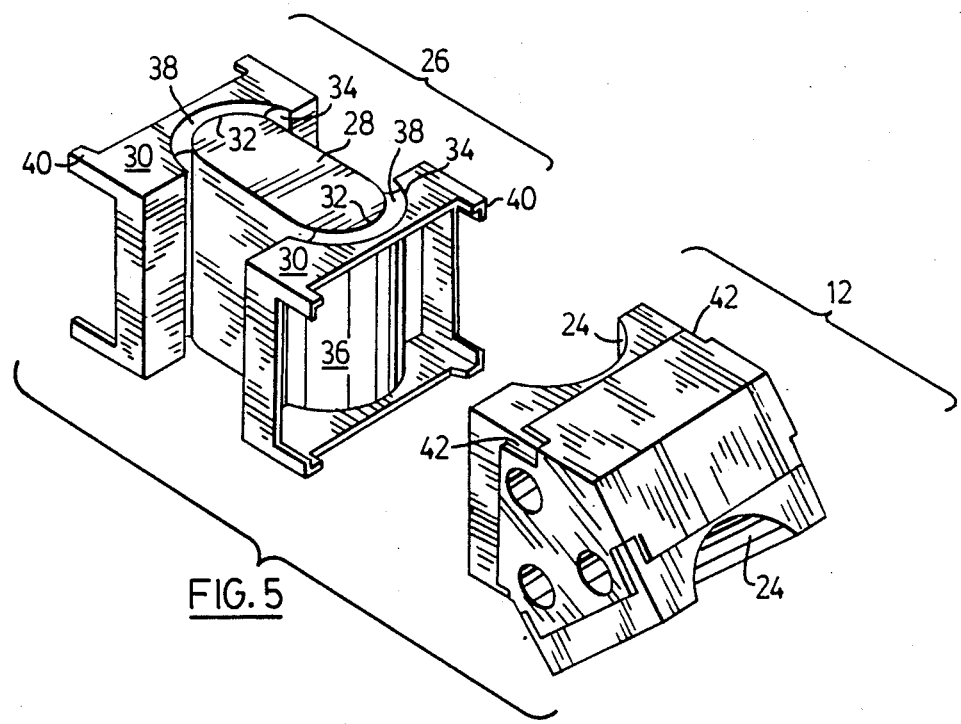
FIG. 5 is a perspective view of an alternate embodiment of a wedge and a flexible element according to the present invention.

The wedges have end faces 24, as shown in FIGS. 4 and 5, which face the adjacent wedges when the coupling is assembled. The end faces of adjacent wedges are approximately parallel when the coupling is assembled.

Figure 2:
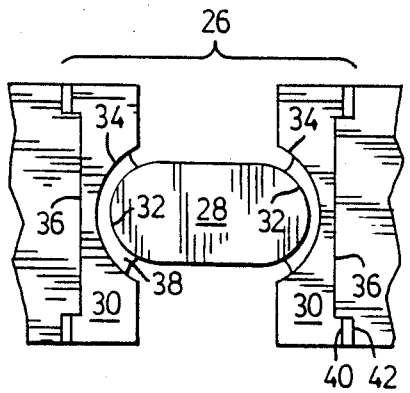
FIG. 2 is a top view of one of the flexible elements of the coupling of the present invention illustrated in FIG. 1.
Figure 3:
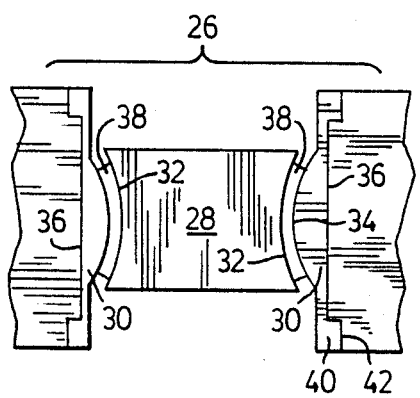
FIG. 3 is a top view, corresponding to FIG. 2, of an alternate embodiment of the flexible element of the flexible drive coupling of the present invention.

As shown in FIG. 1, a flexible element 26 is interspersed between respective end faces 24 of the wedges 12. As shown in FIGS. 2, 3 and 4, the flexible elements 26 have a link 28 between two end plates 30. The link 28 is generally rectangular in shape having curved end surfaces 32 facing the end plates 30. The curvature of the curved end surfaces 32 can be concave as in FIG. 2 or convex as in the alternate embodiment illustrated in FIG. 3.

Referring to FIG. 4, each end plate 30 has an inner surface 34 facing the link 28 and an outer surface 36 facing away from the link 28. The inner surface 34 of the end plate 30 is curved as shown FIGS. 2 and 3 to correspond to the curved end surfaces 32 of the link 28. The inner surface 34 illustrated in FIG. 2 is convex having a radius of curvature slightly greater than that of the convex curved end surface 32 of link 28. In the alternative embodiment shown in FIG. 3, the inner surfaces 34 of the end plates 30 have convex surfaces of slightly smaller radius than the corresponding convex curved end surfaces 32 of link 28. The two curved end surfaces 32 of link 28 form a first pair of surfaces. The two inner surfaces 34 of the two end plates 30 form a second pair of surfaces. The two pairs of surfaces are of opposite curvature, one convex and one concave.

FIG. 5 shows an alternate embodiment of the wedges 12 and flexible elements 26 in which corresponding parts to the embodiment illustrated in FIG. 4 have been indicated by similar reference numbers. In the embodiment illustrated in FIG. 5, the outer surface 36 of the end plate 30 is recessed to form a socket which generally accords with the contour of the inner surface 34. The end faces 24 of the wedge 12 are contoured to conform to and be received by the recess in the outer surface 36 of the flexible element 26.

Referring to FIGS. 2 and 3, the flexible element 26 has an elastomeric filler 38 between each of the inner surfaces 34 of the end plates 30 and the curved end surfaces 32 of the links 28. The elastomeric filler is preferably bonded or molded to the curved end surfaces 32 of the links 28 and the inner surfaces 34 of the end plates 30. The elastomeric filler 38 enables the end plates 30 to pivot with respect to the link 28 by deforming the elastomeric filler. The pivoting would be about an axis perpendicular to the plane of FIGS. 2 and 3 and perpendicular to axis 44. While it would be possible to achieve such deformation of the elastomer without the elastomer being bonded to the end plates 30 or the links 28, bonding of the elastomeric filler is preferred as it simplifies the structure of the flexible elements 26. If bonding is not used, some type of a retention means would be required to prevent the links 28 from moving radially with respect to the axis of symmetry 44 as viewed in FIG. 1. Furthermore, the curved end surfaces 32 of the link 28 and as well the inner surfaces 34 of the end plates 30 would have to be provided with some type of gripping means, such as serrations or the like, to ensure that pivotal motion deforms the elastomeric filler rather than causing relative movement between the elastomeric filler and the surfaces which it contacts. Preferably the thickness of the elastomeric filler is approximately 25% of the radius of curvature of the curved end surfaces 32.

As shown in FIG. 4, the end plates 30 are provided with tabs 40 which project outward from the outer surface 36. The tabs 40 engage corresponding similarly shaped recesses 42 in the end faces 24 of the wedges 12. The tabs 40 and recesses 42 prevent relative movement between the end plates 30 and the wedges 12 in both the radial and axial directions with respect to the axis of symmetry 44 of the assembled coupling 10 as illustrated in FIG. 1. The tabs 40 and sockets 42 therefore hold the link 26 in place between adjacent wedges 12. Alternatively, the end plates 30 could be provided with recesses which correspond to similarly shaped tabs or projections on the end faces 24 of the wedges 12.

In use, the coupling is assembled as shown in FIG. 1 prior to attachment to the flanges 14 and 16. If disc-shaped flanges as shown at 14 and 16 in FIG. 1 are used as the attachment means, the method of attaching the wedges to the driving and driven flanges 14 and 16 respectively must take into account that the heads of the bolts 22, which attach the wedges 12 to the driving flange 14, will be inaccessible once the alternate wedges 12, which attach to the driven flange 16, have been attached. In order to overcome this problem, the driving and driven flanges 14 and 16 can be provided with access holes to access the bolt heads or, other fastening means, such as studs threaded into the wedges, can be used.

In use, the wedges 12 attached to the driving flange 14 transmit rotational force from the driving flange 14 to one end plate 30 of the flexible element 26. The rotational force is transmitted through the elastomeric filler 38 adjacent the aforementioned end plate 30, through the link 28 and to the opposite end plate 30 through the elastomeric filler 38 between this opposite end plate and the link 28. This latter end plate transmits the rotational force to the wedge 12 bolted to the flange 16 of the driven shaft 20. Angular misalignment of the driving and driven shafts 18 and 20 respectively will cause relative movement during rotation of the driving and driven flanges 14 and 16 respectively. This movement will cause the wedges 12 attached to either flange to move toward or away from the opposite flange. This movement of the wedges 12 will cause a corresponding movement in the end plates 30, of the links 26, which engage the respective end faces 24 of those wedges. As described above, one end plate 30 of any link 26 engages a wedge 12 attached to the driving flange 14 and the opposite end plate 30 of the flexible element 26 engages a wedge 12 attached to the driven flange 16 Angular misalignment of the driving and driven elements 18 and 20 respectively will therefore cause the end plates 30 of any particular flexible element 26 to move in opposite directions substantially parallel to the axis of symmetry 44 of the coupling 10. This movement is accommodated by pivoting of the end plates 30 about the curved end faces 32 of the links 28 of the flexible elements 26 by deformation of the elastomeric filler 38 as described above.

Pivoting between the end plates 30 and the link 28 of the flexible element 26 arises both from shearing and compressive deformation of the elastomeric filler. The amount of pivotal movement between the link 28 and the end plate 30 is accordingly greater than would be possible than by applying compressive forces to the same thickness of elastomeric filler The curved surfaces allow greater pivotal motion than would be possible between generally planar surfaces by ensuring that the amount of deformation near the edges of the elastomer is similar to that at the centre. Use of the elastomeric filler 38 to transmit force to and from the links 28 of the flexible element 26 also eliminates clearance which would give rise to free play. Because of the thin layers of elastomer used, more torque can be transmitted by the coupling design of the present invention than would be possible were the entire links 28 made of an elastomeric material.

The resistance to flexion of the coupling of the present invention can be increased by compressing the elastomeric material 38 between the end plate 30 and the link 28. Various means can be used to effect such compression such as placing a circumferential band around the assembled coupling prior to its installation and tightening the band. This forces the wedges radially inward and accordingly forces the end plates 30 toward the links 28 of the flexible elements 26 by deforming the elastomeric filler 38 thus putting the coupling in radial compression. In the uncompressed state, the engagement points on the wedges 12, which can for example be bolt holes 48 as shown in FIG. 1, are at an effective radial distance from the axis of symmetry 44. Upon compression, the distance between the engagement points and the axis of symmetry 44 will be less than that effective radial distance.

In order to maintain the coupling in its compressed state, the perpendicular distance between the rotational axis of the driving and driven shafts, 18 and 20 respectively, and the engagement points or bolt holes 46 of the driving and driven flanges, 14 and 16 respectively, corresponds to the lesser or compressed distance. Once the wedges are attached to the appropriate flanges 14 and 16, the distance between the rotational axis of the driving and driven shafts, 18 and 20 respectively, and the engagement points or bolt holes 46 on the driving and driven flanges, 14 and 16 respectively, will be maintained at less than the effective radial distance. Once the flexible coupling 10 has been attached to the driving and driven flanges, 14 and 16 respectively, the means used to compress the coupling can be removed.

One desirable property of a flexible coupling is that it should have minimum resistance to the deflections required of it. The compression of the elastomeric material in the coupling enables the designer of a coupling according to the present invention to control the stiffness of the coupling in the direction of angular misalignment while maintaining a desirably high stiffness in the torsional direction about the rotational axis. Because of the compression of the elastomeric filler 38 in the flexible elements 26, whenever an angular misalignment exists between the coupled shafts, a resultant force arises which will tend to increase this displacement. This resultant force is referred to as a "negative stiffness" which tends to increase the misalignment, proportionately increasing as the misalignment increases, being approximately zero when the misalignment is zero. The elastomeric material 38 between the end plates 30 and the link 28 of the flexible elements 26 however provides a "positive stiffness" which resists this misalignment. By properly balancing the proportions of the elastomeric filler 38 and the length of the link 28, in combination with the selection of the link pre-load, the designer using this device may make the coupling either positively stiff, negatively stiff or as near zero stiffness as desired.

Figure 6:
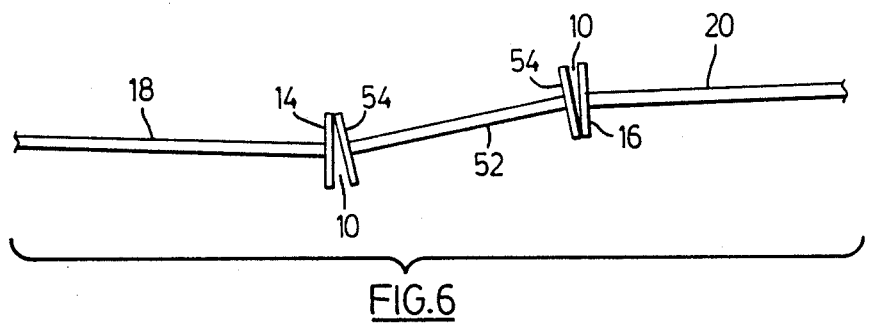
FIG. 6 is a schematic representation of two shafts connected using a pair of flexible elements according to the present invention and an intermediate shaft.

The foregoing description relates to use of one coupling between intersecting axially misaligned shafts. However, a pair of flexible couplings according to the present invention can be effectively used to connect two shafts whose axes do not intersect whether such shafts are parallel or not. In such an arrangement, which is illustrated in FIG. 6, alternate wedges of one of the flexible drive couplings, the locations of which are shown by references 10, are bolted to the driving flange of a driven shaft 20. Alternate wedges of the other of the two flexible drive couplings are bolted to the driven flange 14 of the driving shaft 18. An intermediate shaft 52 is interspersed between the two flexible drive couplings. The intermediate shaft is provided with a flange 54 at either end and the remaining wedges of each of the two flexible drive couplings are bolted each to one of the two flanges 54. In this manner, axial misalignment, which is a misalignment wherein the axis of the two shafts do not intersect, is converted into a pair of intersecting angular misalignments with the intermediate shaft. Each of the angular misalignments is accommodated by the flexible coupling in the manner described above.

It is to be understood that what has been described is a preferred embodiment of the invention and it is possible to make variations while staying within the scope of the invention.

I claim:

1. A flexible drive coupling for transmitting rotational forces between a driving shaft and a driven shaft, said driving and driven shafts having respective attachment means for attachment of said coupling thereto, said flexible drive coupling comprising:
   a plurality of wedges for alternating attachment to said attachment means of said driving and driven shafts, each said wedge having end faces;
   a plurality of flexible elements interspersed between respective end faces of adjacent wedges, said flexible elements having:
   a link having two curved end surfaces;
   two end plates, each end plate having respective inner and outer surfaces, said inner surfaces being shaped so as to co-operate with a respective one of said curved end surfaces of said link;
   al elastomeric filler between each of said inner surfaces of said end plates and said curved end surfaces of said link so that each end plate may pivot with respect to said link by deforming said elastomeric filler; and
   said outer surfaces of said end plates and said end faces of said wedges have co-operating tabs and recesses to prevent relative radial and axial movement.

2. A flexible drive coupling as in claim 1 further being substantially disc shaped, having a general axis of symmetry and attachable to said attachment means by connectors which engage corresponding engagement points on said wedges and on said attachment means;
   said engagement points on said wedges having an effective radial distance from said general axis of symmetry;
   each of said attachment means having a rotational axis; and,
   the radial distance of said corresponding engagement points on said attachment means from said rotational axis being less than said effective radial distance so that when said wedges of said coupling are connected to said attachment means, said coupling is in radial compression.

3. A flexible drive coupling as in claims 1 or 2 wherein said two curved end surfaces of said link form a first pair of surfaces and said inner surfaces of said two end plates are curved and form a second pair of surfaces; and, one pair of said pairs of surfaces are convex, the other pair of said pairs of surfaces are concave.

4. A flexible drive coupling as in claims 1 or 2 wherein said two curved end surfaces of said link form a first pair of surfaces and said inner surfaces of said two end plates are curved and form a second pair of surfaces; one pair of said pairs of surfaces are convex, the other pair of said pairs of surfaces are concave; and, said elastomeric filler is bonded to said inner and end surfaces.

5. A flexible drive coupling as in claims 1 or 2 wherein said two curved end surfaces of said link form a first pair of surfaces and said inner surfaces of said two end plates are curved and form a second pair of surfaces; and, one pair of said pairs of surfaces are convex, the other pair of said pairs of surfaces are concave; and, the thickness of said elastomeric filler is approximately 25% of the radius of the curvature of the surfaces.

6. A flexible drive coupling as in claim 2 wherein said radial compression of said flexible drive coupling causes a negative stiffness in said coupling and said elastomeric filler exerts a positive stiffness acting against said negative stiffness.

7. A flexible drive coupling as in claim 2 wherein said two curved end surfaces of said link form a first pair of surfaces and said inner surfaces of said two end plates are curved and form a second pair of surfaces; one pair of said pairs of surfaces are convex, the other pair of said pairs of surfaces are concave; and, said radial compression of said flexible drive coupling causes a negative stiffness and said elastomeric filler exerts a positive stiffness acting against said negative stiffness.

8. A flexible drive coupling as in claim 2 wherein said two curved end surfaces of said link form a first pair of surfaces and said inner surfaces of said two end plates are curved and form a second pair of surfaces; one pair of said pairs of surfaces are convex, the other pair of said pairs of surfaces are concave; said elastomeric filler is bonded to said inner and end surfaces; and, said radial compression of said flexible drive coupling causes a negative stiffness and said elastomeric filler exerts a positive stiffness acting against said negative stiffness.

9. A flexible coupling assembly for connecting a driving shaft and a driven shaft having respective attachment means for attachment of said coupling assembly thereto;

said flexible coupling assembly having first and second flexible drive couplings connected respectively to opposite ends of an intermediate shaft having attachment means for such connection;

said first and second flexible drive couplings having a plurality of wedges for alternating attachment to said attachment means and a plurality of flexible elements interspersed between respective end faces of adjacent wedges; said flexible elements having:

a link having two curved end surfaces;

two end plates, each end plate having respective inner and outer surfaces, said inner surfaces being shaped so as to co-operate with a respective one of said curved end surfaces of said link;

al elastomeric filler between each of said inner surfaces of said end plates and said curved end surfaces of said link so that each end plate may pivot with respect to said link by deforming said elastomeric filler; and, said outer surfaces of said end plates and said end faces of said wedges having co-operating tabs and recesses to prevent relative radial movement.

10. A coupling means as in claim 9 wherein said first and second flexible drive couplings are substantially disc shaped, have a general axis of symmetry and are attachable to said attachment means by connectors which engage corresponding engagement points on said wedges and on said attachment means;

said engagement points on said wedges having an effective radial distance from said general axis of symmetry;

each of said attachment means having a rotational axis;

and, the radial distance of said corresponding engagement points on said attachment means from said rotational axis being less than said effective radial distance so that when said wedges of said coupling are connected to said attachment means, said coupling is in radial compression.

* * * * *